(12) United States Patent
Kim

(10) Patent No.: US 7,781,497 B2
(45) Date of Patent: Aug. 24, 2010

(54) ANTIBIOTIC METHOD FOR PARTS OF REFRIGERATOR USING ANTIBIOTIC SUBSTANCE

(75) Inventor: Hyun-Kyo Kim, Busan (KR)

(73) Assignee: LG Electronics Inc., Seoul (KR)

( * ) Notice: Subject to any disclaimer, the term of this patent is extended or adjusted under 35 U.S.C. 154(b) by 1036 days.

(21) Appl. No.: 10/550,022

(22) PCT Filed: Mar. 30, 2004

(86) PCT No.: PCT/KR2004/000731

§ 371 (c)(1),
(2), (4) Date: Sep. 23, 2005

(87) PCT Pub. No.: WO2004/088224

PCT Pub. Date: Oct. 14, 2004

(65) Prior Publication Data

US 2006/0198961 A1    Sep. 7, 2006

(30) Foreign Application Priority Data

Apr. 2, 2003    (KR) .................. 10-2003-0020889

(51) Int. Cl.
   *C09D 5/16*    (2006.01)
(52) U.S. Cl. .................. 523/122; 428/323; 156/244.11; 156/244.24
(58) Field of Classification Search ............ 156/244.11, 156/244.44, 244.22; 428/323; 523/122
   See application file for complete search history.

(56) References Cited

U.S. PATENT DOCUMENTS

| | | | | |
|---|---|---|---|---|
| 3,010,861 | A | * | 11/1961 | Reese .......................... 156/199 |
| 5,556,699 | A | * | 9/1996 | Niira et al. .................. 428/323 |
| 6,187,456 | B1 | | 2/2001 | Lever |
| 2002/0185199 | A1 | * | 12/2002 | Myers et al. ................. 148/537 |
| 2004/0137202 | A1 | * | 7/2004 | Hamilton et al. ............ 428/174 |

FOREIGN PATENT DOCUMENTS

| | | |
|---|---|---|
| CN | 1290719 A | 4/2001 |
| CN | 1121943 C | 9/2003 |
| JP | 4-28987 | 1/1992 |
| JP | 5-302781 A | 11/1993 |
| JP | 6-73196 | 3/1994 |
| JP | 8-210761 A | 8/1996 |
| KR | 1997-28334 A | 6/1997 |

OTHER PUBLICATIONS

Machine Translation of JP 2000-178452.*
Abstract JP 2000-178452.*

* cited by examiner

*Primary Examiner*—Richard Crispino
*Assistant Examiner*—Christopher Schatz
(74) *Attorney, Agent, or Firm*—Birch, Stewart, Kolasch & Birch, LLP

(57) ABSTRACT

A conventional part of a refrigerator containing an antibiotic substance has problems in that discoloration occurs with time, a surface of the part of the refrigerator is corroded during a manufacturing process, or the whitening effect is degraded, and production costs increase.

The present invention relates to an antibiotic method for processing a part of a refrigerator using a silver-based antibiotic substance. The antibiotic method comprises the steps of forming a preform of the part to have a thickness relatively smaller than that of a finished product of the part through an extrusion process; mixing 0.05 to 0.1% by weight of the silver-based antibiotic substance in the form of pellets with a resin based on the total weight of the resin; and forming an antibiotic layer on a surface of the preform of the part using the resin with the antibiotic substance mixed therewith. The antibiotic layer may be formed by laminating a film made of the resin with the antibiotic substance mixed therewith, or formed on the surface of the part of the refrigerator through multi-extrusion. Further, the silver-based antibiotic substance may comprise 60 to 80% by weight of an oxide of Ag ions having diameters of several dozen to hundred nanometers, 10 to 20% by weight of zirconium phosphate, and 10 to 20% by weight of a zinc oxide. According to the present invention, there are advantages in that the production costs of the refrigerator are reduced, and the antibiotic and whitening effects are improved.

5 Claims, No Drawings

ANTIBIOTIC METHOD FOR PARTS OF REFRIGERATOR USING ANTIBIOTIC SUBSTANCE

TECHNICAL FIELD

The present invention relates to antibiotic processing of the interior of a refrigerator, and more particularly, to an antibiotic method for processing parts of a refrigerator using a silver-based antibiotic substance.

BACKGROUND ART

A variety of stuff is stored within a refrigerator. A large amount of humidity is always kept within the refrigerator. Particularly, since the temperature of a refrigerating chamber of the refrigerator is relatively higher than that of a freezing chamber thereof, microorganisms including mold or bacteria may easily grow in the refrigerating chamber according to the kind, amount, state or the like of stored stuff.

If microorganisms including mold or bacteria grow within the refrigerator as such, freshness of stored stuff is rapidly deteriorated and it is not good in view of hygiene. Further, there is a problem in that inner parts of the refrigerator, for example, selves and vegetable boxes, particularly liners, made of resins are discolored.

To solve this problem in the prior art, i.e. to improve antibiotic and whitening effects, zinc-based or copper-based inorganic antibiotic substances, organic antibiotic substances or the like have been added to resins for manufacture of parts of refrigerators, thereby imparting the antibiotic and whitening effects. In other words, the parts of the refrigerators are produced by extruding the resins for manufacture of the parts to which the antibiotic substances have been directly added.

However, there are the following problems in such a prior art.

First, since conventional antibiotic substances for imparting antibiotic and whitening effects are zinc-based or copper-based substances with high activity, there is a problem in that they are discolored into yellow with time under the influence of light, heat or the like.

Further, since antibiotic substances are mixed directly with resins for manufacturing parts of refrigerators, inorganic zinc-based or copper-based antibiotic substances or organic antibiotic paints, which are relatively expensive, should be directly added in a large amount such as 0.5 to 5% by weight in order to maintain antibiotic capability and the degree of whitening. Thus, there are many problems in view of their costs.

Moreover, in case of conventional liners, resins with antibiotic substances mixed therewith should be extruded at a high temperature of 210 to 250° C. Other parts such as shelves or vegetable boxes should be subjected to injection molding at a temperature of 300° C. or greater. Therefore, organic antibiotic substances that are relatively weak at high temperature may be easily carbonized and thus cannot properly perform their functions. Gas is easily generated during processes, resulting in corrosion on surfaces of liners or parts. Otherwise, the whitening effect is degraded, resulting in the phenomenon of yellowing. In addition, there is a critical problem such as surging during extrusion.

Particularly, since a relatively large amount of antibiotic substances is used, there is a problem in that much failure such as those described above occurs when parts of refrigerators are manufactured by molding resins with the antibiotic substances mixed therewith.

DISCLOSURE OF INVENTION

Accordingly, the present invention is conceived to solve the problems in the prior art. An object of the present invention is to provide parts of a refrigerator, wherein antibiotic and whitening effects are not deteriorated even after they are used for a long time.

Another object of the present invention is to provide an antibiotic method enabling antibiotic and whitening effects of antibiotic substances to be maximally maintained during a manufacturing process.

According to an aspect of the present invention for achieving the objects, there is provided an antibiotic method for processing a part of a refrigerator using a silver-based antibiotic substance, comprising the steps of forming a preform of the part to have a thickness relatively smaller than that of a finished product of the part through an extrusion process; mixing 0.05 to 0.1% by weight of the silver-based antibiotic substance in the form of pellets with a resin based on the total weight of the resin; and forming an antibiotic layer on a surface of the preform of the part using the resin with the antibiotic substance mixed therewith.

The antibiotic layer may be formed by laminating a film made of the resin with the antibiotic substance mixed therewith.

The antibiotic layer may be formed on the surface of the part of the refrigerator through a two step process.

According to another aspect of the present invention, there is provided an antibiotic method for processing a part of a refrigerator using a silver-based antibiotic substance, comprising the steps of mixing the silver-based antibiotic substance in the form of pellets with a resin; and injection-molding a preform of a finish product of the part using the resin with the silver-based antibiotic substance mixed therewith.

The silver-based antibiotic substance may comprise 60 to 80% by weight of an oxide of Ag ions having diameters of several dozen to hundred nanometers, 10 to 20% by weight of zirconium phosphate, and 10 to 20% by weight of a zinc oxide.

About 0.05 to 0.1% by weight of the silver-based antibiotic substance in the form of pellets may be mixed with the resin based on the total weight of the resin.

The preform of the finished product of the part may be formed by means of a master batch method using the resin with the silver-based antibiotic substance mixed therewith.

With the antibiotic method of processing the part of the refrigerator using the silver-based antibiotic substance according to the present invention constructed as above, there are advantages in that the part is not discolored and its antibiotic capability is maintained for a relatively long time. Further, since only a relatively small amount of the antibiotic substance can be used, there is an advantage in that relatively less failure occurs upon manufacturing the part of the refrigerator.

BEST MODE FOR CARRYING OUT THE INVENTION

Hereinafter, preferred embodiments of an antibiotic method for processing parts of a refrigerator using a silver-based antibiotic substance will be described in detail.

First, an antibiotic substance for use in the present invention comprises 60 to 80% by weight of an oxide of Ag ions having diameters of several dozen to hundred nanometers (nm), 10 to 20% by weight of zirconium phosphate, and 10 to 20% by weight of a zinc oxide. Here, the oxide of Ag ion performs antibiotic and whitening functions, and the zirconium phosphate and zinc oxide serves as a matrix so that the Ag ions can exist stably.

Further, the antibiotic substance is used in the form of pellets in the present invention. This is to solve a problem occurring when the antibiotic substance is in the form of very fine powder and thus cannot be mixed in a proper amount with a resin. That is, the antibiotic substance in the form of fine powder are made into pellets and then mixed in a desired amount with the resin.

The amount of the antibiotic substance mixed with the resin is about 0.05 to 0.1% by weight based on the total amount of the resin. The reason why the antibiotic substance can be used only in such a small amount is that the entire antibiotic substance can be mixed with the resin during a mixing process.

Next, an embodiment of an antibiotic method of the present invention is described. As for the manufacture of parts of a refrigerator, for example, liners, shelves, vegetable boxes, ducts, duct covers and the like, in case of those such as liners that can be manufactured through extrusion, a preform of a part of a refrigerator is extruded to have a thickness slightly smaller than that of a finished product of the relevant part.

An antibiotic layer is formed out of a resin with the antibiotic substance mixed therewith on the preform of the part of the refrigerator extruded as such. To this end, a film is made of the resin with the antibiotic substance mixed therewith. The resin film is laminated on the surface of the preform of the part of the refrigerator. At this time, the use of the antibiotic substance can be minimized if the antibiotic layer is formed on only a portion of the part that will be exposed to the interior of the refrigerator.

The part of the refrigerator is completed by forming the antibiotic layer on the surface of the preform thereof using the antibiotic film. The sum of the thicknesses of the preform of the part of the refrigerator and the antibiotic film should be a designed thickness of the part of the refrigerator. For reference, assuming that the thickness of the preform of the part of the refrigerator is t, it is preferred that the thickness of the antibiotic layer be about t/50 to t/40.

Meanwhile, as another embodiment of the present invention, the antibiotic layer can be formed through a two step process. That is, a preform of a part of a refrigerator is first extruded and the preform is then put into a mold to form the antibiotic layer thereon using the resin with the antibiotic substance mixed therewith.

Here, the preform is also formed to have a thickness relatively smaller than that of a finished product of the part of the refrigerator. Then, a designed thickness can be obtained by forming the antibiotic layer using the resin with the antibiotic substance mixed therewith. When the antibiotic layer is formed through the multi-extrusion as in this embodiment of the present invention, the antibiotic layer is formed on the entire surface of the preform of the part. Therefore, the antibiotic layer is formed on a side of the part exposed to the interior of the refrigerator as well as an opposite side thereof.

Next, a further embodiment of the present invention will be described. In this embodiment, a silver-based antibiotic substance is formed into pellets that in turn are mixed with a resin for manufacture a part of a refrigerator. The resin is melted and then injection-molded to form the part of the refrigerator. This is applied to the formation of parts of the refrigerator that can be injection-molded.

That is, the silver-based antibiotic substance is formed into pellets, and about 0.05 to 0.1% by weight of the silver-based antibiotic substance is mixed with the resin. The resin with the antibiotic substance mixed therewith is melted and put into an injection mold to manufacture a desired part of a refrigerator.

In this case, a desired part of a refrigerator is formed at one time. The antibiotic substance used in such a process has a composition described above and is formed into pellets and then put-into the resin that is a base material.

Furthermore, a master batch method is used for much even distribution of the silver-based antibiotic substance in the part of the refrigerator. Through the master batch method, the silver-based antibiotic substance is uniformly distributed in the entire part of the refrigerator. With the use of such a method, the antibiotic substance exists in the entire part of the refrigerator so that the antibiotic effect lasts for a long time and thus is improved.

With the antibiotic method of processing a part of a refrigerator using the silver-based substance according to the present invention specifically described above, it is possible to obtain the following advantages.

In the present invention, since the oxide of Ag ions with the matrix of zirconium phosphate and zinc oxide is used as the antibiotic substance, the antibiotic substance is relatively chemically stable. Therefore, discoloration does not occur and the antibiotic capability is not deteriorated during a manufacturing process at a high temperature of 300° C. or greater, thereby relatively improving the whitening and antibiotic properties.

Further, since the antibiotic substance is a chemically stable substance, it is not discolored and does not have a reduced antibiotic capability even though it is continuously exposed to ultraviolet rays for a long term use. Therefore, microorganisms including mold or bacteria are suppressed not to grow at the surface of the part of the refrigerator, thereby improving freshness of stored foodstuffs and keeping an atmosphere of the interior of the refrigerator cleaner.

Meanwhile, since the antibiotic substance is formed into pellets that in turn are mixed with a resin in the present invention, a desired amount of the antibiotic substance can be accurately mixed with the resin. Since only the exact amount of the antibiotic substance is mixed with the resin, production costs are reduced, and failure that may occur due to input of an unnecessary large amount of the antibiotic substance can be minimized. Consequently, there is an advantage in that upon forming a coating layer or manufacturing the part of the refrigerator, the quality of the surface of the part can be improved.

The scope of the present invention is not limited to the embodiments described above but defined only by the appended claims. It is apparent to those skilled in the art that various modifications and changes can be made within the scope of the invention defined by the appended claims.

The invention claimed is:

1. An antibiotic method for processing a part of a refrigerator using a silver-based antibiotic substance, comprising the steps of:

forming a preform of the part to have a thickness relatively smaller than that of a finished product of the part through an extrusion process;

mixing 0.05 to 0.1% by weight of the silver-based antibiotic substance with a resin based on the total weight of the resin; and forming an antibiotic layer on a surface of the preform of the part using the resin with the antibiotic substance mixed therewith, wherein the silver-based antibiotic substance comprises 60 to 80% by weight of an oxide of Ag ions having diameters of several dozen to hundred nanometers, 10 to 20% by weight of zirconium phosphate, and 10 to 20% by weight of a zinc oxide.

2. The method as claimed in claim 1, wherein the antibiotic layer is formed by laminating a film made of the resin with the antibiotic substance mixed therewith.

3. The method as claimed in claim 1, wherein the antibiotic layer is formed on the surface of the part of the refrigerator by extruding the preform and placing the preform into a mold and forming the antibiotic layer thereon.

4. The method as claimed in claim 1, further comprising mixing the silver-based antibiotic substance in the form of pellets with the resin.

5. The method of claim 4, further comprising forming the pellets from powder.

\* \* \* \* \*